United States Patent Office 3,432,224
Patented Mar. 11, 1969

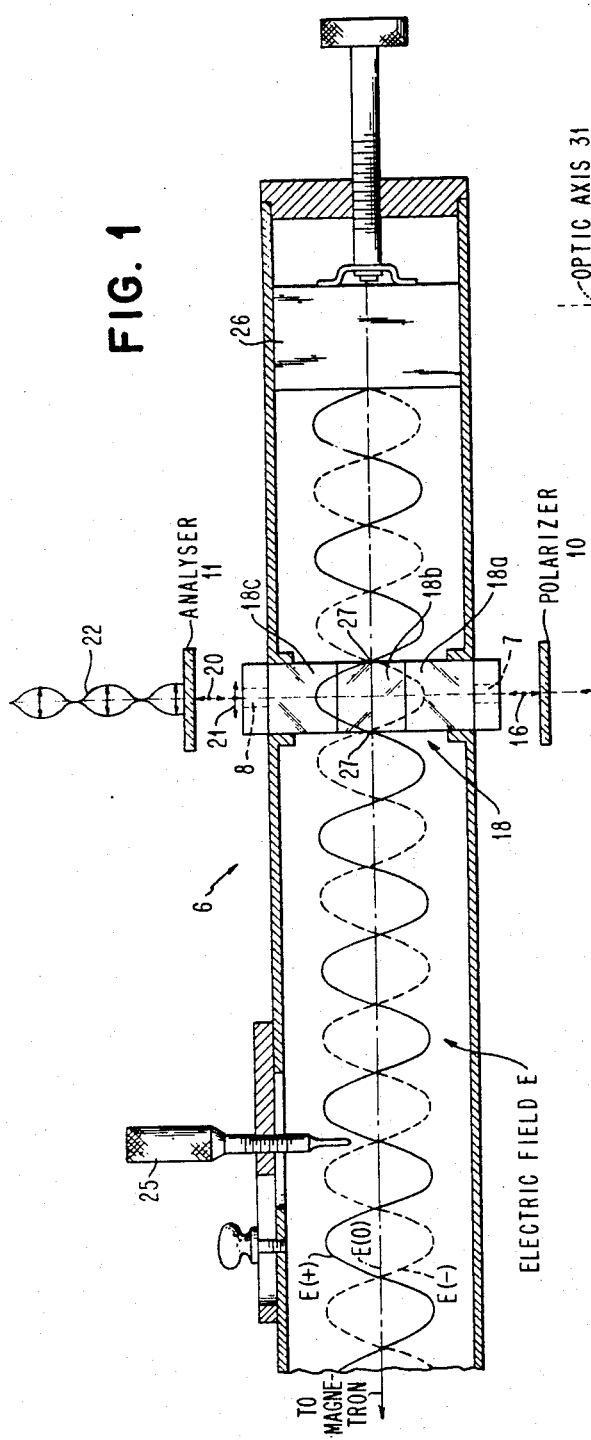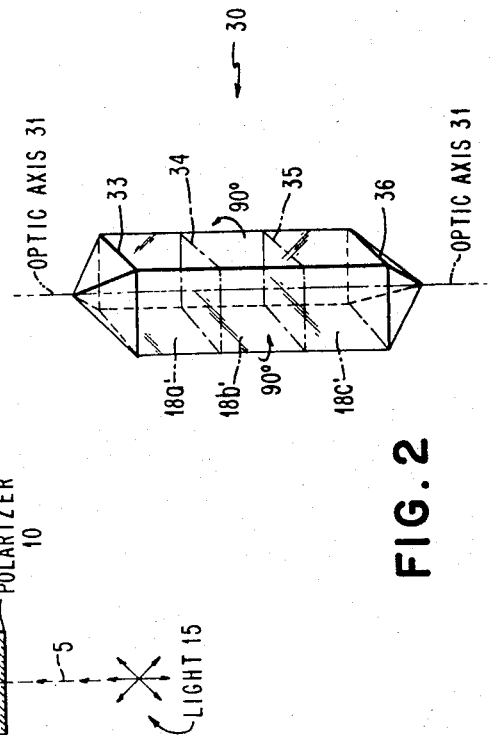

3,432,224
STANDING WAVE ELECTRO-OPTIC
LIGHT MODULATOR
Robert A. Myers, New York, N.Y., and Peter S. Pershan,
Florham Park, N.J., assignors to International Business
Machines Corporation, New York, N.Y., a corporation
of New York
Filed Aug. 25, 1964, Ser. No. 391,854
U.S. Cl. 350—150                                    11 Claims
Int. Cl. G02f 1/26, 1/24, 1/28

ABSTRACT OF THE DISCLOSURE

A light modulating device is provided that includes a resonant cavity containing a standing wave electric field. A relatively thick crystal, consisting of three sections with a center section being rotated with respect to the two end sections, is included in the cavity to change the polarization of light passing through the crystal. Increased depth of modulation is provided by the cumulative change in polarization as the light passes through each of the three crystal sections.

---

Light modulators have been constructed employing materials exhibiting birefringent properties in response to the application of magnetic, electric, or acoustic fields. The material is placed between a crossed polarizer and analyzer. Modulation is achieved by varying the field applied to the material thereby changing the polarization of the light as it passes through the material.

One problem arising in the type of modulator described above is the degree of modulation, or depth of modulation, attainable by such a device. The strength of the modulating field can be increased. However the largest change in polarization is limited by the inherent properties of the material.

Another way of increasing the change in polarization is to enlarge the thickness of the material through which the light passes. This method is limited by the frequency of the modulating field. If the field changes polarity (goes from a positive direction to a negative direction) while a light wave is still passing through the material, the change in polarization induced in the light wave by the negative field tends to cancel the change in polarization induced by the positive field. Therefore the depth of modulation can be increased only up to a certain point by enlarging the thickness of the material. Further increase in the thickness tends to decrease the net change in polarization.

When the modulating field is in the microwave frequency range, the material must be relatively thin since the distance traveled by a light wave during the interval between a change in polarity of the microwave field is comparatively small. One technique for avoiding this problem is shown in the publication "Microwave Modulation of the Electro-Optic Effect in KH$_2$PO$_4$," by I. P. Kaminow, Physical Review Letters, vol. 6, No. 10, May 15, 1961. This publication teaches the use of a cavity tuned to produce standing waves. A rod of material exhibiting birefringent properties in response to the wave is located axially within the cavity. One component of the standing wave travels along the rod at the same speed as light propogates through the rod. By matching the velocity of this component of the standing wave with the velocity of the light, cancellation of the induced change in polarization is avoided. However the cavity and rod must be carefully constructed to match the velocity of one component of the standing wave with the velocity of light.

It is an object of the present invention to provide an improved light modulator.

Another object of the present invention is to provide apparatus for increasing the depth of light modulation for a given modulating field strength.

Still another object of the present invention is to provide a light modulator wherein the velocity of light and the velocity of the modulating field need not be matched.

A further object of the present invention is to provide apparatus for producing a large modulating depth while maintaining a wide bandwidth.

Another object of the present invention is to provide a device for modulating light in which the modulating power can be readily coupled to the device without complex instrumentation.

These and other objects of the present invention are accomplished by providing a material composed of a plurality of individual layers. The layers are rotated, or otherwise oriented, with respect to one another so that each layer is capable of inducing a change in the polarization of light passing therethrough which opposes the direction of change induced by the neighboring layers when all of the layers are subjected to the same modulating field.

Further, by selecting the thickness of the layers to be equal to the distance a light wave propagates during one half of a cycle of the modulating field, the change in polarization induced in the light wave by each layer is cumulative as the wave propogates through the layers. In this manner, although the modulating field changes polarity while the light wave is propagating through the layers of material, this change in polarity is compensated for by the orientation of the layers.

A plurality of layers can be arranged in the manner described above so that the depth of modulation can be significantly increased over that attainable with a single layer of material. This feature is particularly advantageous where the modulating signal is in the microwave frequency range.

A further advantage of the present invention is the absence of any required match between the velocity of the modulating field and the velocity of light as it propagates through the material.

The foregoing and other objects, features and advantages of the invention will be apparent from the following more particular description of a preferred embodiment of the invention, as illustrated in the accompanying drawings.

In the drawings:

FIG. 1 is a diagram illustrating a light modulator embodying the present invention;

FIG. 2 is a diagram of a crystal having properties capable of use in the modulator of FIG. 1.

Figure 3:
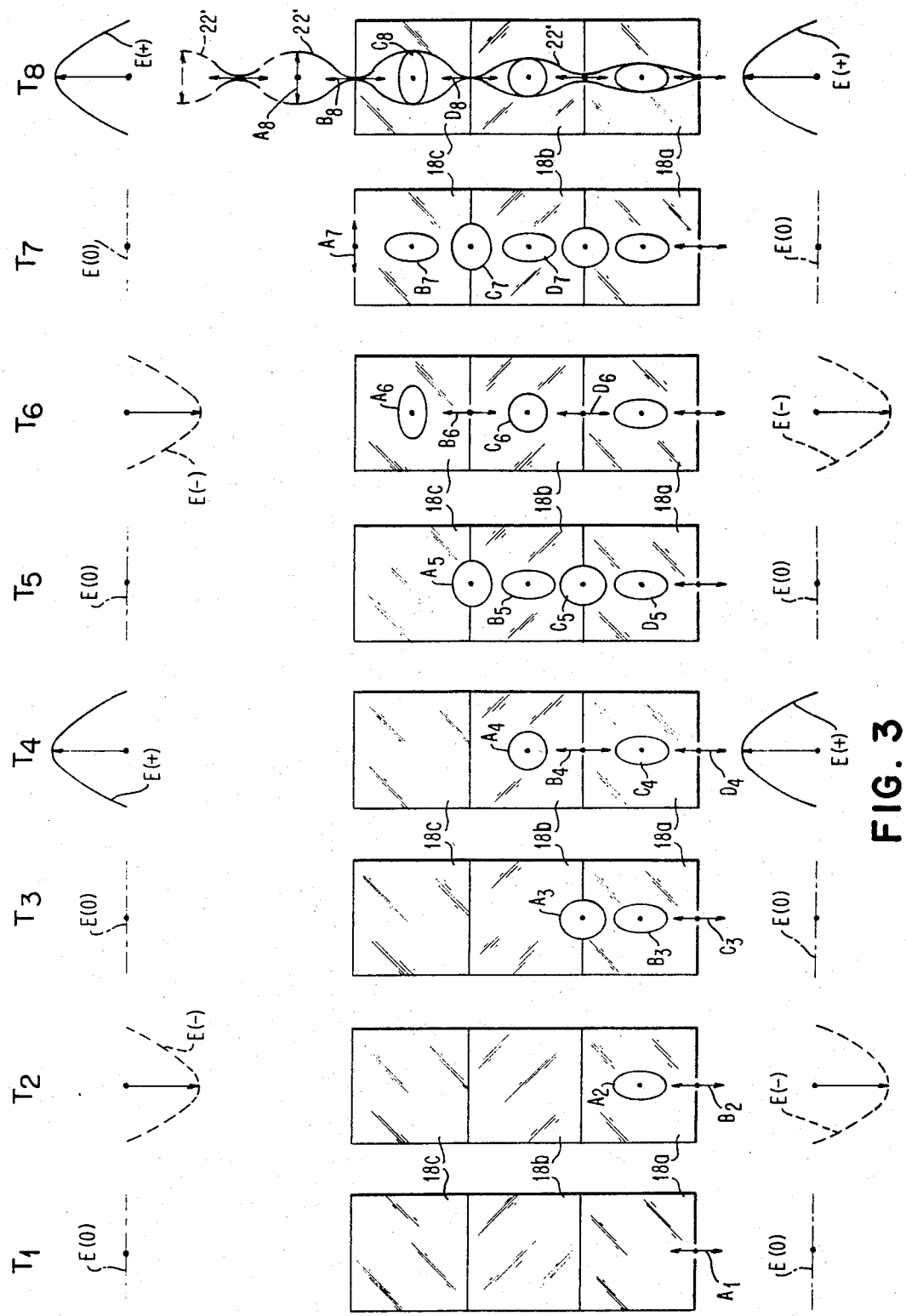
FIG. 3 is a diagram illustrating the manner in which the polarization of light is changed as it passes through the modulator in FIG. 1.

A light modulator embodying the present invention is shown in FIG. 1. The light travels along a path 5 through a resonant cavity 6 having apertures 7 and 8. An electric field E in the form of a standing wave is set up within the cavity 6 by coupling the cavity 6 to a magnetron (not shown).

A polarizer 10 and an analyzer 11 are oriented so that their polarization directions are mutually perpendicular. The polarizer 10 operates in a conventional manner passing plane polarized light vibrating in a single direction. This operation is illustrated in FIG. 1 by the cluster of arrows 15 which represents unpolarized light, and an arrow 16 which represents plane polarized light emerging from polarizer 10. Although the arrow 16 lies along the light path 5, it is understood that the plane polarized light vibrates in a transverse direction rather than a longitudinal direction with respect to the light path 5. Therefore the arrow 16, and all other arrows in FIGS. 1 and 3 lying along the direction of propagation of the light, represent transverse wave motion vibrating in a plane perpendicular to the direction of light propagation in FIGS. 1 and 3.

The plane polarized light emerging from polarizer 10 passes through a crystal structure 18 including three layers 18a–c. The manner in which the layers 18a–c are oriented with respect to one another is described in detail with reference to FIG. 2. The structure 18 alters the polarization of the light along path 5 in response to the field E as illustrated generally by the arrows 20 and 21 in FIG. 1. The manner in which the direction of polarization is changed is described in detail with reference to FIG. 3.

Analyzer 11 operates in a conventional manner passing only that component of the light along path 5 polarized in the direction of arrow 21. The other component of light polarized in a direction perpendicular to the plane of FIG. 1 represented by the arrow 20 is blocked by analyzer 11. In this manner the intensity of the light emerging from analyzer 11 varies as a function of the electric field E. The variation in intensity is represented by an envelope 22 of the plane polarized light emerging from analyzer 11. Suitable utilization means such as a traveling wave phototube (not shown) may be placed along path 5 to detect the envelope 22.

The electric field E within the cavity 6 is in a form of standing wave. The standing wave is illustrated in FIG. 1 at three different positions during its cycle. The full line sinusoidal waveform designated $E(+)$ represents the maximum field strength in one direction, to be called the positive direction. At one-half cycle later the field distribution within the cavity 6 is represented by the broken line sinusoidal waveform designated $E(-)$. At this time the field is a maximum in the negative direction.

Between the time when the field is a maximum in the positive direction $E(+)$ and a maximum in the negative direction $E(-)$ the field strength throughout the cavity 6 is zero represented by the phantomline designated $E(0)$.

The standing wave electric field E is created in a conventional manner by tuning the cavity with a slide-screw tuner 25 and adjustable shorting plunger 26. The field E includes a plurality of nodes, two of which are designated 27 in FIG. 1. The electric field strength at nodes 27 is substantially zero at all times during the cycle. As shown in FIG. 1 structure 18 is located between the pair of nodes 27 so that the field strength is substantially zero at the sides of the structure 18 while the center along path 5 undergoes a maximum field strength variation with time. While the waveforms $E(+)$ and $E(-)$ are illustrated in FIG. 1 to embrace only a portion of the layers 18a and 18c, the field strength throughout the entire structure 18 is uniform in a vertical direction.

The structure 18 shown in FIG. 1 includes three layers 18a–c which may be formed from a single crystal 30 shown in FIG. 2. Crystal 30 is formed from potassium dihydrogen phosphate $KH_2PO_4$ (commonly known as KDP) and has an optic axis 31 through the center. The structure 18 can be formed by cutting the crystal 30 along a group of planes 33–36 forming three layers 18a'–18c'.

The layer 18b' is rotated 90° about the optic axis 31. This rotation causes layer 18b' to induce an opposing change in polarization with respect to that induced by layers 18a' and 18c' when all three layers are subjected to the same electric field E. The operation of the layers 18a'–18c', which correspond to layers 18a–18c respectively in FIG. 1, is described in detail with reference to FIG. 3.

FIG. 3 includes eight separate illustrations of the layers 18a–c. Each illustration represents the operation of the light modulator in FIG. 1 at eight different times $T_1$–$T_8$. The times $T_1$–$T_8$ span almost two cycles of the modulating electric field E. For example, at $T_1$ the field E is substantially zero. This is represented in FIG. 3 by the phantom waveform $E(0)$ located above and below the first illustration of the crystal layers 18a–c to indicate that the field at $T_1$ is substantially zero throughout the layers 18a–c.

During the interval between $T_1$ and $T_2$ the field approaches a maximum in negative direction. At times $T_2$ the field reaches the maximum represented by the waveform $E(-)$. As described with reference to FIG. 1 the field is uniform in the vertical direction throughout the layers 18a–c.

At time $T_3$ the field is zero, and at time $T_4$ the field is a maximum in the positive direction. One full cycle is completed at time $T_5$ when the field returns to zero once again. The field E at times $T_6$, $T_7$ and $T_8$ is the same as the field E at times $T_2$, $T_3$ and $T_4$ respectively.

The operation of the present invention may be described by following the progress of a light wave through the layers 18a–c examining the state of the polarization at each of the eight times $T_1$–$T_8$. The first wave is represented by the letter A with subscripts corresponding to the times $T_1$–$T_8$. At time $T_1$ when the field E is half way through the transition from $E(+)$ maximum to $E(-)$ maximum, wave A enters the layer 18a after having passed through polarizer 10 in FIG. 1. The state of polarization is represented by an arrow $A_1$. At time $T_2$ the wave A has advanced half way through the layer 18a and its polarization is represented by an ellipse $A_2$. The symbols $A_3$–$A_8$ represent the polarization of the waveform A at times $T_3$–$T_8$ respectively.

As the light wave $A_1$ travels through layer 18a during the interval between time $T_1$ and $T_2$ the polarization changes. The polarization of light wave $A_1$ can be considered to be composed of two mutually perpendicular components (not shown). As the two components of $A_1$ pass through layer 18a one component is delayed with respect to the other producing elliptically polarized light in a well-known manner. The ellipse $A_2$ is a Lissajous figure of the two mutually perpendicular components of the light wave A at time $T_2$.

During the interval from time $T_2$ to time $T_3$ the delayed component of the light wave A is delayed an additional amount with respect to the other mutually perpendicular component. Therefor the Lissajous figure $A_3$ is in the form of an ellipse having less eccentricity then the ellipse $A_2$. As shown in FIG. 3, the field applied to layer 18a (and layers 18b and c) during the interval between time $T_1$ and $T_3$ is in the negative direction, reaching a maximum $E(-)$ at time $T_2$. During the interval between time $T_3$ and $T_5$ the field is in the positive direction, reaching a maximum $E(+)$ at time $T_4$. In spite of this charge in polarity of the field E, the change in polarization of wave A is cumulative in layers 18a and 18b since layer 18b is rotated 90° about the optic axes as described with reference to FIG. 2. The component of light wave A delayed during the interval between $T_1$ and $T_3$ is also delayed during the interval between $T_3$ and $T_5$. Therefore the phase delay between the mutually perpendicular components of wave A is increased. The Lissajous figure at time $T_4$ is represented by the circle $A_4$. Circularly polarized light occurs when the phase delay between the two mutually perpendicular components is equal to 90°. All other phase delays produce elliptically polarized light.

During the interval between $T_4$ and $T_5$ the phase delay becomes larger causing the Lissajous figure $A_5$ to appear as an ellipse having a major diameter in the horizontal direction as opposed to the vertical major diameter of ellipses $A_2$ and $A_3$.

Once again the field E becomes negative during the interval between $T_5$ and $T_7$ causing a larger phase delay to be introduced between the mutually perpendicular components of the wave A. The eccentricity of the ellipse becomes greater as shown by Lissajous figure $A_6$ until the ellipse collapses into a single horizontal line represented by the arrow $A_7$ indicating that the light is now polarized in the plane of FIG. 3. Arrow $A_7$ is in the same direction as the polarization axis of analyzer 11 in FIG. 1.

Next described is the manner in which a second light wave B, first appearing at $T_2$, propagates through the layers 18a–c shown in FIG. 3. The symbols $B_2$–$B_8$ are used to designate the polarization of wave B at time $T_2$–$T_8$ respectively. As indicated by arrows $B_2$ and $B_8$, no change in polarization results from propagation through layers 18a–18c.

At time $T_2$ the wave $B_2$ enters the layer 18a in a plane polarized state. During the interval between time $T_2$ and $T_3$ one of the components of light wave B is delayed forming elliptically polarized light represented by the Lissajous figure $B_3$. The same amount of delay is introduced in wave B during the interval between time $T_2$ and $T_3$ as the delay introduced in the wave A during the interval between time $T_1$ and $T_2$. Therefore the shape of the ellipses $A_2$ and $B_3$ is identical.

During the interval of time between time $T_3$ and $T_4$ the field E applied to layer 18a is reversed with respect to the field E between $T_2$ and $T_3$. Therefore one mutually perpendicular component of wave B is delayed between $T_2$ and $T_3$ and the other component is delayed between $T_3$ and $T_4$. At time $T_4$ the two components are once again in phase resulting in the plane polarized light represented by arrow $B_4$. A similar operation takes place as light wave B passes through layers 18b and 18c resulting in plane polarized light represented by arrow $B_8$.

A third light wave C first appearing at $T_3$ is represented in FIG. 3, by the symbols $C_3$–$C_8$. The change in polarization experienced by wave C as it propagates through layers 18a–18c is similar to that experienced by wave A. While the symbols $C_3$–$C_8$ are identical to $A_1$–$A_6$ respectively, a slight difference exists between waves A and C. One of the mutually perpendicular components of the plane polarized light wave A entering layer 18a is delayed during the interval between $T_1$ and $T_3$, while the orthogonal component of wave C is delayed during the interval between $T_3$ and $T_5$. This is due to the opposite polarity of the field E during these intervals. The layer 18a (and layers 18b and 18c) alternately delays one component and then the other as the field E changes polarity. However the Lissajous figures $A_3$ and $C_5$ appear the same because the phase delay between components is the same.

A fourth light wave D first appearing at $T_4$ represented by the symbols $D_4$–$D_8$ undergoes a similar effect as waveform B at times $T_2$–$T_6$.

At time $T_8$ an envelope 22' is drawn about that component of light waves A–D (and two waves preceding A) polarized in the horizontal direction. The envelope 22' illustrates the manner in which the horizontally polarized component builds up as the light propagates through layers 18a–18c. While waves A–D are selected to illustrate the operation because they represent the maximum and minimum change in polarization, it is apparent that other light waves intermediate these selected examples experience more moderate changes in polarization which result in a continuous light wave within the envelope 22'.

In summary what has been shown is a light modulator employing a crystal structure 18 which is considerably longer than the distance light propagates during one-half of the cycle of the modulating electric field E. The length of the structure 18 permits an increased depth of modulation over that attainable by a single layer. The polarity of the electric field E reverses while light is propagating through the structure 18. However, cancellation of the induced change in polarization is avoided by introducing a relative rotation of 90° about the optic axis 31 between layer 18b and adjacent layers 18a and 18c shown in FIG. 2. A cumulative change in polarization is thereby achieved.

The electric field E includes two components one traveling from left to right and the other traveling from right to left. There is no requirement in the present invention to match the velocity of the light along path 5 with the velocity of either component of the electric field E. The only adjustment necessary to the cavity 6 is the routine adjustment of the slide-screw tuner 25 and adjustable shorting plunger 26.

The following is a table of preferred values and dimensions suitable for operation of the present invention. These values are set forth by way of example only and the invention is not limited to them.

TABLE I

| | |
|---|---|
| Thickness of each layer 18a–18c | 0.245" |
| Length and width of layers | 0.120" |
| Frequency of electric field E | $16.0 \times 10^9$ c.p.s. |
| Loaded Q of cavity 6 | 50 |
| Size of aperture 7 and 8 | 0.1" |
| Bandwidth of modulator | 320 mc. |
| Height of cavity 6 | 0.622" |
| Material of structure 18 | $KH_2PO_4$ |

It has been found by experimentation that the bandwidth limitations upon the structure 18 are less severe than the bandwidth limitations upon the cavity 6. That is, variations in the frequency of the electric field E cause detuning of the cavity 6 prior to appreciable deterioration of the depth of modulation of the light passing through structure 18.

The bandwidth of the structure 18 can be increased by slightly adjusting the thickness of the layers 18a–18c. That is, by making one layer undersized and another layer oversized with respect to the modulating frequency of field E, the crystal structure becomes less sensitive to the modulating frequency and therefore produces a wider bandwidth capable of accommodating modulating fields E within a wider range of frequencies. However, the depth of modulation decreases because nonuniform successive layers will not exactly reinforce each other as in structure 18.

While field E is shown in FIG. 1 having a uniform amplitude the amplitude may be varied in accordance with some information bearing function to produce a corresponding amplitude variation in the envelope 22. Further the field need not be a standing wave, but could be any oscillating field such as a traveling wave. While the frequency of the traveling wave must be adjusted, the propagation velocity need not match with the velocity of the modulated light.

Other crystal material such as sphalerite (zinc sulphide in the cubic phase) may be employed instead of KDP, the material employed in the illustrated embodiment. For other materials it may be necessary to adjust the orientation of alternate layers in some way other than rotating the layer 18b 90° about the optic axis 31 as shown in FIG. 2. Further, different materials may be used for each layer of the structure 18 to produce the same effect as the present invention. Various other materials may be used which respond to magnetic or acoustic fields as opposed to the electric field E.

Still another modification may be made by providing additional layers such as layers 18a–c to increase the depth of modulation. Further the polarizer 10 may be eliminated where the source of light is naturally polarized, for example certain laser light. Additionally, the light need not be plane polarized when entering layer 18a, but could be elliptically polarized, or circularly polarized. The polarized light may also be accompanied by some unpolarized light, i.e. noise.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. Apparatus for modulating a beam of light, comprising:
   modulating means for producing a field oscillating at a given frequency; and
   a plurality of layers of material located in said field in the path of and receiving said beam of light, each layer operative to produce elliptically polarized light composed of two mutually perpendicular components from said beam alternately delayed in response to said oscillating field, said layers being arranged to transmit said beam of light sequentially therethrough, the thickness of each layer being selected to be a function of the distance traveled by said beam of light during one-half of a cycle of said frequency of said oscillating field, and adjacent layers being selected to introduce a delay to different components of said elliptically polarized light in response to the same field, whereby one of said components is cumulatively delayed as said light beam propagates through said layers.

2. Apparatus as defined in claim 1 wherein said layers of material are composed of potassium dihydrogen phosphate crystal material.

3. Apparatus as defined in claim 1 wherein said layers of material are composed of zinc sulphide in the cubic phase.

4. Apparatus for modulating a beam of light, comprising:
a modulating means for producing a field oscillating at a given frequency; and
a purality of layers of material located in said field in the path of and receiving said beam of light, each layer operative to produce ellipticaly polarized light composed of two mutually perpendicular components from said beam alternately delayed in response to said oscillating field, said layers being arranged to transmit said beam of light sequentially therethrough, the thickness of each layer being substantially equal to the distance traveled by said beam of light during one-half of a cycle of said frequency of said oscillating field, and adjacent layers being selected to introduce a delay to different components of said elliptically polarized light in response to the same field, whereby one of said components is cumulatively delayed as said light beam propagates through said layers.

5. Apparatus for modulating a beam of light, comprising:
modulating means for producing a field oscillating at at given frequency;
a polarizer and an analyzer having crossed polarization axes and located so that said beam of light passes therethrough; and
a plurality of layers of material located in said field between said polarizer and analyzer in the path of and receiving said beam of light, each layer operative to produce elliptically polarized light composed of two mutually perpendicular components from said beam alternately delayed in response to said oscillating field, said layers being arranged to transmit said beam of light sequentially therethrough, the thickness of each layer being selected to be substantially equal to the distance traveled by said beam of light during one-half of a cycle of said frequency of said oscillating field, and adjacent layers being selected to introduce a delay to different components of said elliptically polarized light in response to the same field, whereby one of said components is cumulatively delayed as said light beam propagates through said layers.

6. Apparatus for modulating a beam of light, comprising:
a cavity tuned to produce a field of standing waves oscillating at a given frequency and including at least two nodes at which the field is substantially zero; and
a plurality of layers of material located in said cavity between said two nodes in the path of and receiving said beam of light, each layer operative to produce elliptically polarized light composed of two mutually perpendicular components from said beam, alternately delayed in response to the oscillating field between said two nodes, said layers being arranged to transmit said beam of light sequentially therethrough, the thickness of each layer being selected to be substantially equal to the distance traveled by said beam of light during one-half of a cycle of said frequency of said standing wave, and adjacent layers being selected to introduce a delay to different components of said elliptically polarized light in response to the same field, whereby one of said components is cumulatively delayed as said light beam propagates through said layers.

7. Apparatus as defined in claim 6 further characterized by the addition of a polarizer and an analyzer having crossed polarization axes and located on opposite sides of said layers so that said beam of light passes sequentially through said polarizer, layers and analyzer.

8. Apparatus for modulating a beam of light, comprising:
modulating means for producing a field oscilating at a given frequency; and
a plurality of layers of potassium dihydrogen phosphate crystal material having an optic axis, each of said layers being located in said field and arranged in a stack with optic axes aligned parallel to one another, said layers being further arranged to transmit said beam of light sequentially therethrough, the thickness of each layer being selected to be a function of the distance traveled by said beam of light during one-half of a cycle of said field, and adjacent layers in said stack having a relative angular displacement of 90° about said optic axes.

9. Apparatus for modulating a beam of light, comprising:
a cavity tuned to produce a field of standing waves oscillating at a given frequency and including at least two nodes at which the field is substantially zero; and
a plurality of layers of potassium dihydrogen phosphate crystal material having an optic axis, each of said layers being located in said cavity between said two nodes and arranged in a stack with optic axes aligned parallel to one another, said layers being arranged to transmit said beam of light sequentially therethrough, the thickness of each layer being selected to be substantially equal to the distance traveled by said beam of light during one-half of a cycle of said field, and adjacent layers in said stack having a relative displacement of 90° about said optic axes.

10. Apparatus as defined in claim 9 further characterized by the addition of a polarizer and an analyzer having crossed polarization axes and located on opposite sides of said layers so that said beam of light passes sequentially through said polarizer, layers and analyzer.

11. Apparatus as defined in claim 10 wherein said field is an electric field oscillating at a microwave frequency.

References Cited

UNITED STATES PATENTS

| | | | |
|---|---|---|---|
| 3,200,698 | 8/1965 | Froome et al. | 350—150 X |
| 3,239,670 | 3/1966 | Bloembergen | 350—150 X |
| 3,259,015 | 7/1966 | Marcatili | 350—150 |

DAVID SCHONBERG, *Primary Examiner.*

U.S. Cl. X.R.

350—149, 157, 160